United States Patent
Ozawa

(10) Patent No.: US 11,801,815 B2
(45) Date of Patent: Oct. 31, 2023

(54) BRAKE HYDRAULIC PRESSURE CONTROLLER

(71) Applicant: Robert Bosch GmbH, Stuttgart (DE)

(72) Inventor: Kouichi Ozawa, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 501 days.

(21) Appl. No.: 17/260,033

(22) PCT Filed: Jul. 12, 2019

(86) PCT No.: PCT/IB2019/055953
§ 371 (c)(1),
(2) Date: Jan. 13, 2021

(87) PCT Pub. No.: WO2020/012426
PCT Pub. Date: Jan. 16, 2020

(65) Prior Publication Data
US 2021/0284114 A1    Sep. 16, 2021

(30) Foreign Application Priority Data

Jul. 13, 2018  (JP) .................. 2018-132782

(51) Int. Cl.
*B60T 13/16* (2006.01)
*F04B 37/10* (2006.01)
(Continued)

(52) U.S. Cl.
CPC ............ *B60T 13/168* (2013.01); *F04B 37/10* (2013.01); *F04B 53/10* (2013.01); *F15B 15/20* (2013.01)

(58) Field of Classification Search
CPC ........ B60T 13/168; B60T 8/368; F04B 53/10; F04B 37/10
See application file for complete search history.

(56) References Cited

U.S. PATENT DOCUMENTS 3,363,702 A * 1/1968 Bielstein ............... E21B 12/02
                                                           175/39
6,203,117 B1 * 3/2001 Starr ..................... B60T 8/4068
                                                           303/DIG. 11
(Continued)

FOREIGN PATENT DOCUMENTS

DE    102013222464 A1    5/2017
EP       2949525 A1     12/2015
(Continued)

OTHER PUBLICATIONS

International Search Report and Written Opinion for Application No. PCT/IB2019/055953 dated Oct. 29, 2019 (13 pages).

*Primary Examiner* — Abiy Teka
(74) *Attorney, Agent, or Firm* — Michael Best & Friedrich LLP

(57) ABSTRACT

The present invention provides a brake hydraulic pressure controller capable of suppressing retention of air bubbles on a release side of a pump.
The brake hydraulic pressure controller includes: a housing; a motor attached to the housing; and plural pump elements, each of which is attached to a recess formed on a side surface of the housing and driven by a motor. Each of the pump elements includes: a suction valve suctioning a brake fluid into a pump chamber; a release valve releasing the brake fluid from the pump chamber; and a channel forming member arranged on a release side of the release valve. The channel forming member includes: a spring chamber accommodating a spring for urging a valve body of the release valve in a closing direction; and a passage communicating between the spring chamber and an outer surface of the channel forming member. The passage in the channel forming member of each of the plural pump elements extends (Continued)

upward from a position including a top portion of the spring chamber in a vertical direction and is connected to the outer surface.

6 Claims, 4 Drawing Sheets

(51) Int. Cl.
*F04B 53/10* (2006.01)
*F15B 15/20* (2006.01)

(56) References Cited

U.S. PATENT DOCUMENTS

| | | | |
|---|---|---|---|
| 9,802,595 B2 * | 10/2017 | Kratzer | ............ B60T 13/146 |
| 2002/0171286 A1 | 11/2002 | Ohishi et al. | |
| 2015/0016787 A1 * | 1/2015 | Lin | ............ G02B 6/4214 |
| | | | 385/93 |

FOREIGN PATENT DOCUMENTS

| | | | | |
|---|---|---|---|---|
| EP | 3363702 A1 * | 8/2018 | ............ | B60T 8/368 |
| JP | H0558260 A | 3/1993 | | |
| JP | 2013071491 A | 4/2013 | | |
| KR | 20180065261 A1 | 6/2018 | | |

* cited by examiner

[FIG. 1]
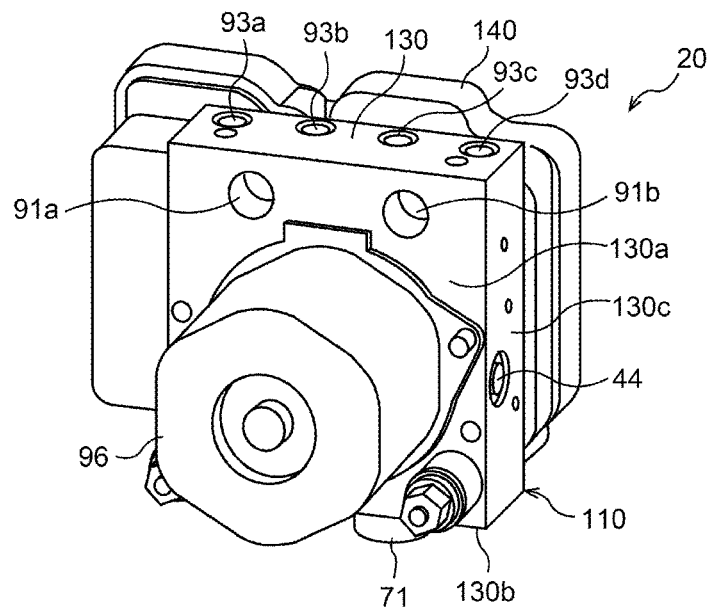
[FIG. 2]
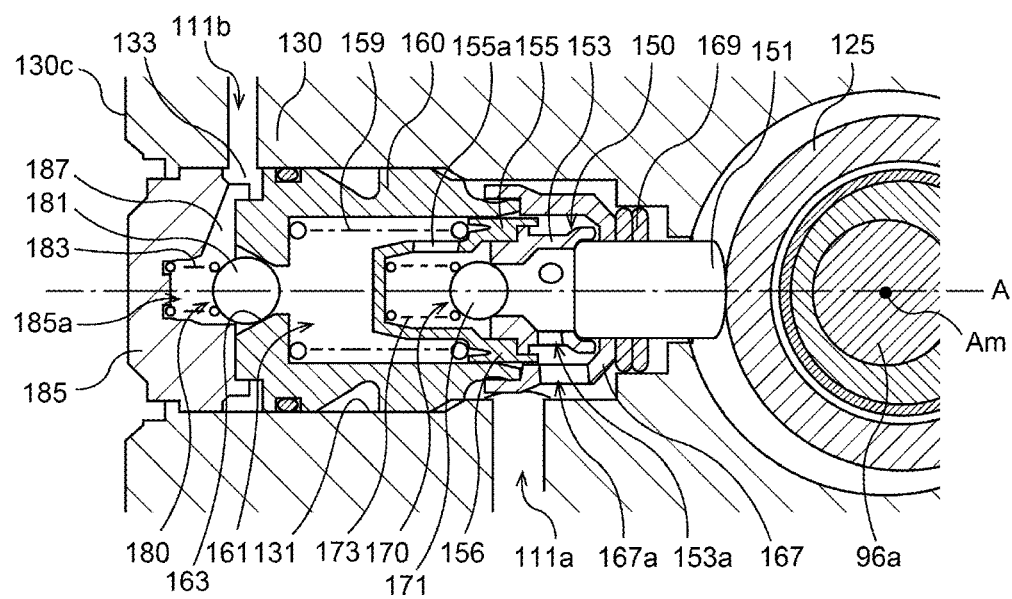

[FIG. 3]
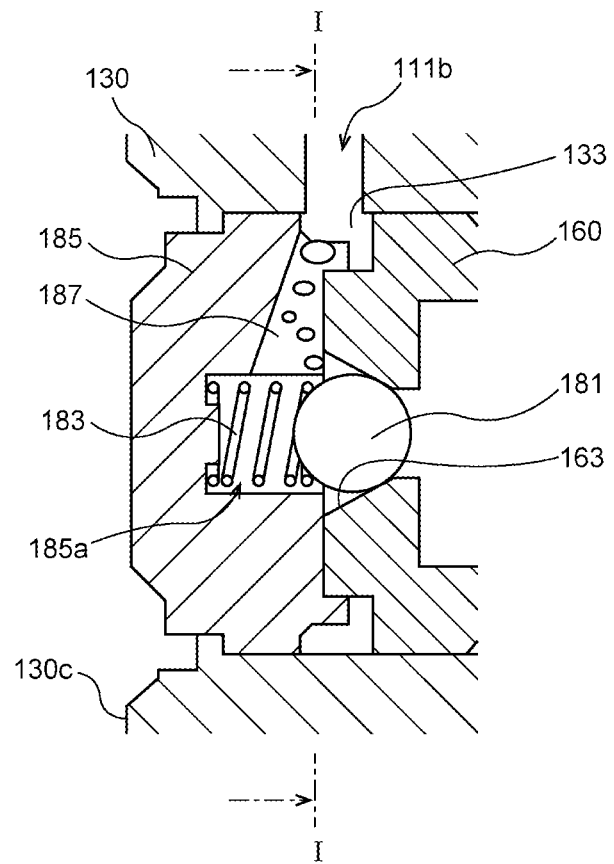
[FIG. 4]
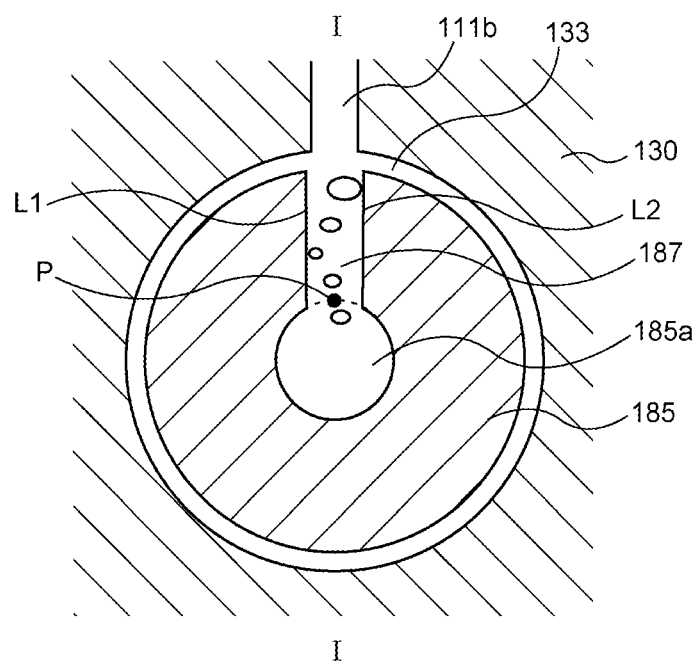

[FIG. 5]
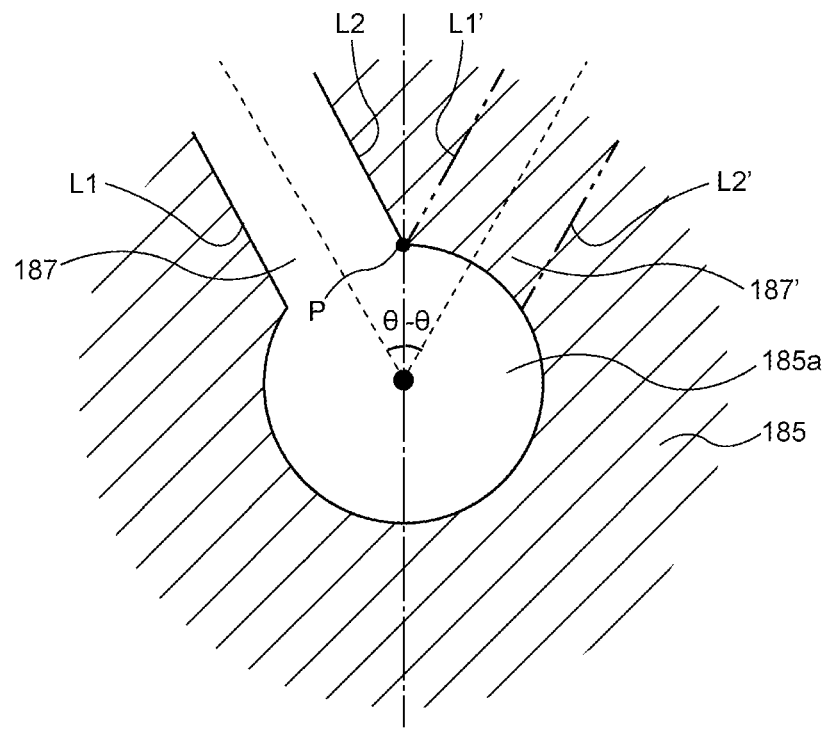
[FIG. 6]
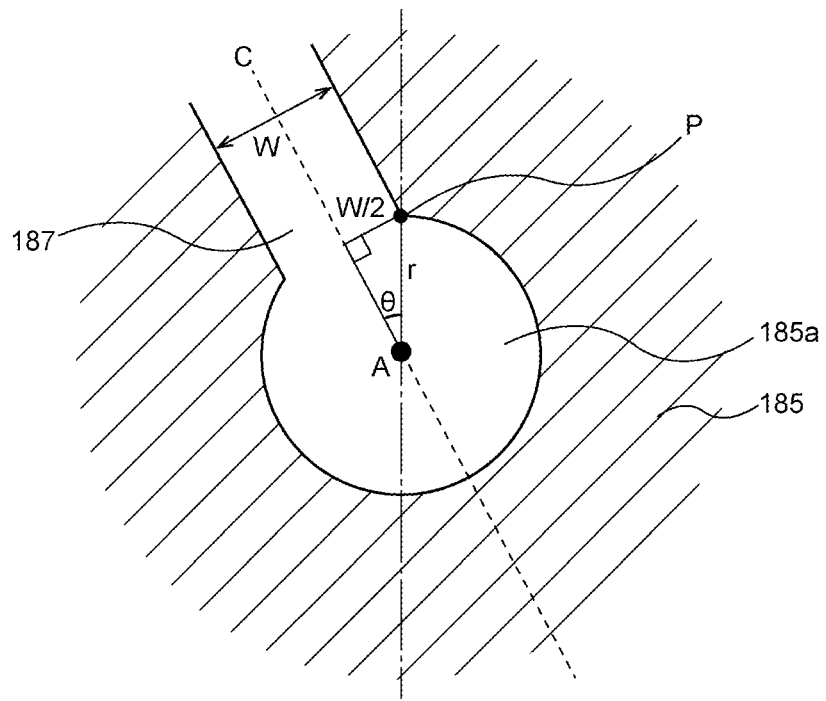

[FIG. 7]
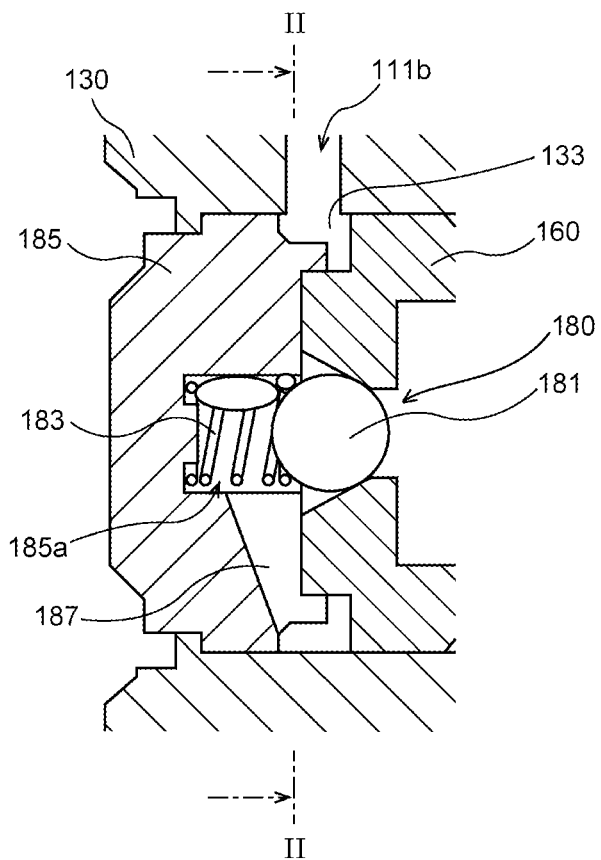
[FIG. 8]
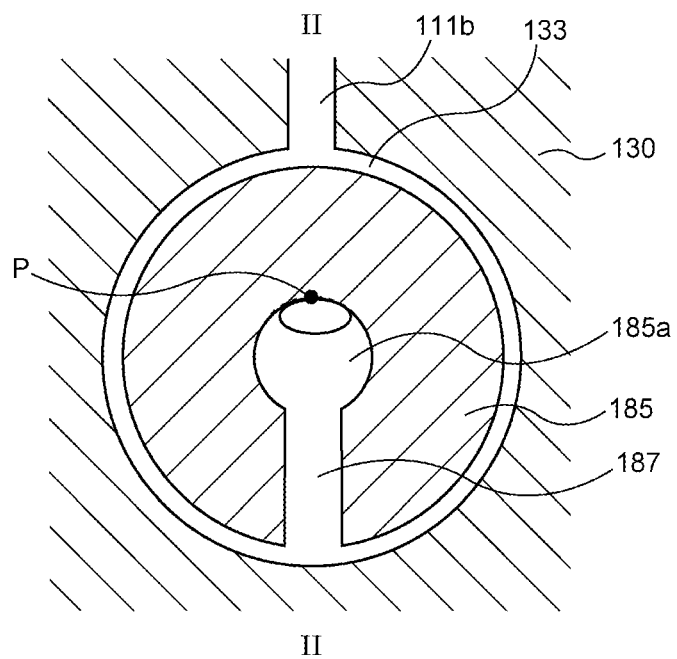

BRAKE HYDRAULIC PRESSURE CONTROLLER

BACKGROUND OF THE INVENTION

The present invention relates to a brake hydraulic pressure controller.

Conventionally, a brake hydraulic pressure controller that executes brake control by controlling a hydraulic pressure of a brake fluid, which is supplied to a braking section of a wheel, in a hydraulic circuit has been known. The brake hydraulic pressure controller includes: a hydraulic unit having the hydraulic circuit; and a control unit.

The hydraulic unit includes a freely openable/closable regulation valve, a pump operated in an interlocking manner with the regulation valve, an electric motor for driving the pump, and the like. The brake hydraulic pressure controller is automatically operated by electronic control, and controls a braking force that is generated on the wheel by increasing or reducing the hydraulic pressure in the brake hydraulic circuit.

The pump in the hydraulic unit is attached to a recess formed on an outer surface of a housing. An eccentric cam is provided on a motor shaft of the electric motor, and a piston of the pump reciprocates in conjunction with rotation of the eccentric cam. In this way, the pump releases the brake fluid in the brake hydraulic circuit (for example, JP-A-2013-071491).

SUMMARY OF THE INVENTION

FIG. 7 is a cross-sectional view of a pump assembly including a release valve 180 in an axial direction, and FIG. 8 is a schematic view of a housing 130 and a cover member 185 in a cross section taken along II-II in FIG. 7.

As illustrated in FIG. 7 and FIG. 8, the pump assembly attached to a recess of the housing 130 includes the cover member 185 that is caulked and fixed by an opening edge of the recess. The cover member 185 includes: a spring chamber 185a that accommodates a spring 183 for urging a valve body 181 of the release valve 180; and a passage 187 through which the released brake fluid is delivered to an oil channel 111b.

Here, there is a case where air is mixed in the brake hydraulic circuit. In the case where the cover member 185 is arranged such that the passage 187 extends downward in a vertical direction from the spring chamber 185a, air bubbles that are contained in the brake fluid released from the release valve 180 tend to be retained in the spring chamber 185a. In the case where the air bubbles are retained in the spring chamber 185a, operating noise of the brake hydraulic pressure controller possibly becomes loud.

The present invention has been made in view of the above problem and therefore provides a brake hydraulic pressure controller capable of suppressing retention of air bubbles on a release side of a pump.

According to an aspect of the present invention, a brake hydraulic pressure controller that controls a hydraulic pressure in a brake hydraulic pressure circuit is provided. The brake hydraulic pressure controller includes: a housing that is formed with a channel for a brake fluid; a motor that is attached to the housing; and plural pump elements, each of which is attached to a recess formed on a side surface of the housing and is driven by the motor. Each of the pump elements includes: a suction valve that suctions the brake fluid into a pump chamber; a release valve that releases the brake fluid from the pump chamber; and a channel forming member that is arranged on a release side of the release valve. The channel forming member includes: a spring chamber that accommodates a spring for urging a valve body of the release valve in a closing direction; and a passage that communicates between the spring chamber and an outer surface of the channel forming member. The passage in the channel forming member of each of the plural pump elements extends upward from a position including a top portion of the spring chamber in a vertical direction, and is connected to the outer surface.

Advantageous Effects of Invention

As it has been described so far, according to the present invention, it is possible to prevent retention of air bubbles on a release side of a pump.

BRIEF DESCRIPTION OF DRAWINGS

FIG. 1 is a perspective view of a brake hydraulic pressure controller according to an embodiment of the present invention.

FIG. 2 is a cross-sectional view of a state where a pump element is attached to a recess of a housing.

FIG. 3 is an enlarged cross-sectional view of a release valve and a cover member in the pump element.

FIG. 4 is an explanatory view schematically illustrating the housing and the cover member.

FIG. 5 is a schematic view of the cover member as seen in an axial direction.

FIG. 6 is an explanatory view illustrating an inclination angle of a passage.

FIG. 7 is a cross-sectional view of a pump assembly including a release valve in the axial direction as a reference example.

FIG. 8 is a schematic view of a housing and a cover member as the reference example.

DETAILED DESCRIPTION

A detailed description will hereinafter be made on a preferred embodiment of the present invention with reference to the accompanying drawings. In the present specification and the drawings, components that have substantially the same functional configurations will be denoted by the same reference signs, and a description thereon will not be repeated.

<1. Brake Hydraulic Pressure Controller>

A description will be made on an overall configuration example of a brake hydraulic pressure controller according to this embodiment with reference to FIG. 1. FIG. 1 is a perspective view of a brake hydraulic pressure controller 20. The brake hydraulic pressure controller 20 includes a hydraulic unit 110 and an ECU 140.

The brake hydraulic pressure controller 20 is provided in a brake system of a vehicle, and controls a braking force on each wheel. The brake hydraulic pressure controller 20 illustrated in FIG. 1 is a device that is provided in the brake system for a four-wheeled vehicle, and is configured to be able to execute electronic stability program (ESP) control.

The hydraulic unit 110 includes a housing 130. The housing 130 includes: two connection ports 91a, 91b to which two pressure chambers of an unillustrated master cylinder are connected; and four connection ports 93a to 93d, each of which is connected to a wheel cylinder of the unillustrated wheel.

Oil channels are formed in the housing 130. A first hydraulic circuit in which the one connection port 91a and the two connection ports 93a, 93b are connected, and a second hydraulic circuit in which the one connection port 91b and the two connection ports 93c, 93d are connected are formed.

Each of the first hydraulic circuit and the second hydraulic circuit includes plural control valves, an accumulator 71, and a pump element 44. Each of the plural control valves, the accumulator 71, and the pump element 44 is attached to a recess formed on an outer surface of the housing 130 and is interposed in the middle of the oil channel.

The plural control valves include a circuit control valve, a suction control valve, a booster regulator, and a pressure regulator. The booster regulator and the pressure regulator are provided in the oil channel that communicates with the wheel cylinder of each of the wheels. The circuit control valve communicates the master cylinder and the booster regulator or block the communication between the master cylinder and the booster regulator. The suction control valve communicates the master cylinder and a suction side of the pump element 44 or block the communication between the master cylinder and the suction side of the pump element 44.

The booster regulator can be controlled linearly, and boosts a wheel cylinder pressure while continuously regulating a flow rate of a brake fluid from a side of the master cylinder and the circuit control valve to the wheel cylinder side of each of the wheels. The pressure regulator is a control valve switchable between being fully opened and being fully closed, and, in an open state, supplies the brake fluid, which has been supplied to the wheel cylinder of each of the wheels, to the accumulator 71, so as to reduce the wheel cylinder pressure.

The accumulator 71 accumulates or releases the brake fluid while changing a volume of the accumulator 71 in accordance with a pressure of the brake fluid that is supplied via the pressure regulator.

The pump element 44 is actuated by driving of a motor 96 and releases the brake fluid. The suction side of the pump element 44 is connected to the accumulator 71 via a check valve. While allowing movement of the brake fluid from the accumulator 71 side to the suction side of the pump element 44, the check valve prohibits the movement of the brake fluid in a reverse direction. A release side of the pump element 44 is connected to the oil channel that connects the circuit control valve and the booster regulator.

As illustrated in FIG. 1, the motor 96 is attached to a side surface 130a of the housing 130. The pump element 44 is attached to a side surface 130c that continues perpendicularly from the side surface 130a. The other pump element 44 (not illustrated in FIG. 1) is attached to a side surface that continues perpendicularly from the side surface 130a and is located on a back surface side of the side surface 130c.

The two accumulators 71 (only one of them is illustrated in FIG. 1) are attached to a lower surface 130b that continues perpendicularly from both of the side surface 130a, to which the motor 96 is attached, and the side surface 130c, to which the pump element 44 is attached.

The circuit control valve, the suction control valve, the booster regulator, and the pressure regulator are attached to a back surface side of the side surface 130a, to which the motor 96 is attached. The ECU 140 is also attached to the back surface side of the side surface 130a, to which the motor 96 is attached.

The ECU 140 includes an electronic control board that executes drive control of the plural control valves and the motor 96, and the like. During operation of the ESP, the ECU 140 controls opening/closing of each of the plural control valves, so as to control the braking force on each of front wheels and rear wheels on right and left sides.

The hydraulic unit 110 may further include a pressure sensor, a damper, or the like in addition to the above constituent elements.

<3. Pump Element>

Next, a detailed description will be made on the pump element 44 that is provided in the brake hydraulic pressure controller 20 according to this embodiment.

(Configuration Example of Pump Element)

FIG. 2 is a cross-sectional view of a state where the pump element 44 is attached to a recess 131 of the housing 130. In the following description, an arrangement direction of a piston structure 150 in the pump element 44 may be referred to as a tip side, and a reverse direction of the tip side may be referred to as a rear end side.

On the one side surface 130c of the housing 130, the recess 131 that accommodates the pump element 44 is formed. The recess 131 is a stepped hole in a substantially columnar shape that extends in an orthogonal direction to a direction of an axis Am of a motor shaft 96a. One end side of the recess 131 is opened to the side surface 130c of the housing 130, and the other side thereof is opened to a space where the motor shaft 96a is arranged.

Two oil channels 111a, 111b are connected to the recess 131 from a direction that crosses a direction of an axis A of the recess 131. Of these oil channels 111a, 111b, the oil channel 111a is a channel through which the brake fluid is delivered to the pump element 44. The oil channel 111b is a channel through which the brake fluid released from the pump element 44 flows.

The pump element 44 includes the piston structure 150. The piston structure 150 abuts an eccentric bearing 125 that is eccentrically supported on the motor shaft 96a. By rotation of the eccentric bearing 125, the piston structure 150 reciprocates in the direction of the axis A, and the pump element 44 thereby suctions or releases the brake fluid.

The pump element 44 has the piston structure 150, a spring 159, an accommodation member 160, a suction valve 170, a release valve 180, and a cover member 185. In this embodiment, the cover member 185 has a function as a channel forming member.

In conjunction with the rotation of the eccentric bearing 125, the piston structure 150 reciprocates in the orthogonal direction to the direction of the axis Am of the motor shaft 96a. A portion of the piston structure 150 on the rear end side is accommodated in the accommodation member 160. The accommodation member 160 is a member that is press-fitted into the recess 131 and is fixed to the cover member 185, for example.

The accommodation member 160 has an accommodation chamber 161 that is an axial hole provided along the direction of the axis A. The accommodation chamber 161 has a function as a pump chamber. That is, the pressure of the brake fluid that has flowed into the accommodation chamber 161 via the suction valve 170 is boosted. Then, the brake fluid is released via the release valve 180.

The accommodation chamber 161 is opened to the tip side, and a rear end portion of the piston structure 150 is slidably inserted in the accommodation chamber 161 from the tip side. The accommodation chamber 161 accommodates the spring 159. The spring 159 is a mode of an urging member, is held in a compressed state between the piston structure 150 and the accommodation member 160, and urges the piston structure 150 toward the tip side.

A guide member 167 that holds the piston structure 150 in a freely slidable manner is attached to a tip portion of the accommodation member 160. One or plural through-holes 167a are provided on a circumferential surface of the guide member 167. Each of the through-holes 167a communicates between the outside and the inside of the guide member 167.

In this embodiment, the piston structure 150 is configured to include a tip member 151, an intermediate member 153, and a base section 155.

The tip member 151 is a substantially columnar member, a tip of which is formed to have a projected curved surface. The tip member 151 is a portion that comes in contact with the eccentric bearing 125 eccentrically supported on the motor shaft 96a of the motor 96. A rear end portion of the tip member 151 is held by the intermediate member 153. The tip member 151 is slidable on the guide member 167 and the housing 130.

On the tip side of the piston structure 150 from the guide member 167, an annular seal member 169 is provided between the tip member 151 and the recess 131.

The intermediate member 153 is a substantially columnar hollow member having an axial hole that is opened at both ends in the direction of the axis A. The tip member 151 is held by a tip portion of the intermediate member 153, and a rear end portion of the intermediate member 153 is held by the base section 155.

One or plural through-holes 153a are provided on a circumferential surface of the intermediate member 153. Each of the through-holes 153a communicates between the outside and the inside of the intermediate member 153.

The base section 155 is a substantially columnar hollow member, and the tip side thereof holds the intermediate member 153 and is formed as an opening end. The base section 155 has a sliding section 156 that can slide on an inner circumferential surface of the accommodation chamber 161 in the accommodation member 160.

One or plural through-holes 155a are provided on a circumferential surface of the base section 155 on the rear end side from the sliding section 156. Each of the through-holes 155a communicates between the outside and the inside of the base section 155. In the base section 155, a valve body 171 and a spring 173 that constitute the suction valve 170 are accommodated.

The spring 173 is held in a compressed state between the valve body 171 and the base section 155 and urges the valve body 171 toward the intermediate member 153. In the intermediate member 153, a circumferential edge of an opening on the rear end side of the axial hole serves as a seat section that the valve body 171 abuts.

A tapered hole 163 is provided on a rear end surface of the accommodation member 160. The tapered hole 163 communicates the outside on the rear end side of the accommodation member 160 and the accommodation chamber 161 with each other. The tapered hole 163 is provided such that a diameter thereof is increased toward the rear end side. The tapered hole 163 serves as a seat section that a valve body 181 of the release valve 180 abuts.

The release valve 180 is configured to include the valve body 181, the accommodation member 160, a spring 183, and the cover member 185. The cover member 185 has a function of fixing the pump element 44. The cover member 185 is attached to the housing 130 in a liquid-tight manner so as to prevent leakage of the brake fluid from the recess 131.

In this embodiment, the cover member 185 is fitted to a rear end portion of the accommodation member 160, and is caulked and fixed by an opening edge of the recess 131. The cover member 185 has a spring chamber 185a and a passage 187.

The spring chamber 185a is a columnar space that extends in the direction of the axis A and is opened to the tip side. The spring chamber 185a accommodates the spring 183. The spring 183 is held in a compressed state between the valve body 181 and a bottom surface of the spring chamber 185a. The spring 183 urges the valve body 181 toward the tapered hole 163. That is, the spring 183 urges the valve body 181 in a closing direction of the release valve 180.

The passage 187 communicates between the spring chamber 185a and an outer surface of the cover member 185, so as to deliver the brake fluid released from the release valve 180 to the oil channel 111b. In this embodiment, one end of the passage 187 is opened to an outer circumferential surface of the cover member 185, and a fluid chamber 133 is formed at an opened position of the passage 187. The brake fluid is guided to the oil channel 111b via the fluid chamber 133.

In the pump element 44 configured as described above, in the case where the piston structure 150 moves to the tip side in conjunction with the rotation of the eccentric bearing 125 caused by driving of the motor 96, a volume of the accommodation chamber 161 is increased, and consequently, a hydraulic pressure in the accommodation chamber 161 is reduced. At this time, while the release valve 180 is closed, the suction valve 170 is opened. In this way, the brake fluid flows into the accommodation chamber 161.

On the contrary, in the case where the piston structure 150 moves to the rear end side in conjunction with the rotation of the eccentric bearing 125 caused by driving of the motor 96, the volume of the accommodation chamber 161 is reduced, and consequently, the hydraulic pressure in the accommodation chamber 161 is boosted. At this time, while the suction valve 170 is closed, the release valve 180 is opened. In this way, the brake fluid is released via the release valve 180. The released brake fluid flows into the oil channel 111b via the passage 187 and the fluid chamber 133 in the cover member 185. As described above, the pump element 44 repeatedly suctions and releases the brake fluid in conjunction with the rotation of the motor 96.

(Arrangement of Passage)

Next, a description will be made on arrangement of the passage 187 that is formed in the cover member 185 with reference to FIG. 3 and FIG. 4. A description will hereinafter be made on the passage 187 in the cover member 185 of the one pump element 44. However, in the brake hydraulic pressure controller 20 according to this embodiment, the passage 187 in the cover member 185 of each of all the pump element 44 is arranged in the same manner.

FIG. 3 is an enlarged cross-sectional view of the release valve 180 and the cover member 185 in the pump element 44. FIG. 4 is an explanatory view schematically illustrating the housing 130 and the cover member 185 at a position on a cross section taken along I-I in FIG. 3. An up-down direction in FIG. 3 and FIG. 4 corresponds to an up-down direction of the vertical direction.

In the brake hydraulic pressure controller 20 according to this embodiment, the passage 187, which is formed in the cover member 185, extends upward from a position including a top portion P of the spring chamber 185a in the vertical direction, and is connected to the outer surface of the cover member 185. In the example illustrated in FIG. 3 and FIG. 4, the passage 187 extends upward along the vertical direction from the position including the top portion P of the spring chamber 185a in the vertical direction.

Accordingly, when the cover member 185 is seen in the axial direction, the top portion P of the spring chamber 185a in the vertical direction is located between left and right boundary lines L1, L2 of the passage 187. Thus, in the case where air is mixed in the hydraulic circuit, the air that is released with the brake fluid via the release valve 180 is not retained in the spring chamber 185a but is released to the fluid chamber 133. Therefore, during the operation of the brake hydraulic pressure controller 20, it is possible to suppress operating noise from becoming loud due to retention of air bubbles in the spring chamber 185a.

The direction in which the passage 187 extends from the spring chamber 185a is not limited to the upward direction of the vertical direction. As long as the top portion P of the spring chamber 185a in the vertical direction is located between the left and right boundary lines L1, L2 of the passage 187 at the time when the cover member 185 is seen in the axial direction, the passage 187 may be inclined to one of the left and right sides from the upward direction of the vertical direction. In such a case, a state where the top portion P of the spring chamber 185a in the vertical direction is located between the left and right boundary lines L1, L2 of the passage 187 includes a state where one of the boundary lines L1, L2 crosses the top portion P in the vertical direction.

FIG. 5 is a schematic view of the cover member 185 as seen in the axial direction. FIG. 5 illustrates the passage 187 that is inclined to the left at a maximum angle (an inclination angle=$\theta$) such that the top portion P of the spring chamber 185a in the vertical direction is located between the left and right boundary lines L1, L2 of the passage 187.

An intersection of the one boundary line L2 of the passage 187 and the spring chamber 185a is located above an intersection of the other boundary line L1 and the spring chamber 185a, and the intersection of the boundary line L2 and the spring chamber 185a matches the top portion P of the spring chamber 185a in the vertical direction. Accordingly, in the case where the air moves to the top portion P of the spring chamber 185a in the vertical direction, the air is released upward via the passage 187.

Similarly, a passage 187' illustrated in FIG. 5 is a case of the passage 187 that is inclined to the right at a maximum angle (an inclination angle=$-\theta$) such that the top portion P of the spring chamber 185a in the vertical direction is located between the left and right boundary lines L1, L2 of the passage 187.

An intersection of one boundary line L1' of the passage 187' and the spring chamber 185a is located above an intersection of the other boundary line L2' and the spring chamber 185a, and the intersection of the boundary line L1' and the spring chamber 185a matches the top portion P of the spring chamber 185a in the vertical direction. Accordingly, in the case where the air moves to the top portion P of the spring chamber 185a in the vertical direction, the air is released upward via the passage 187.

In the case where a center line C of the passage 187 overlaps the axis A of the spring chamber 185a, the passage 187 may extend such that a width W of the passage 187, a radius r of the spring chamber 185a, and the inclination angle $\theta$ of the passage 187 satisfy the following equation (1).

[Formula 1]

$$-\sin^{-1}(W/2r) < \theta < \sin^{-1}(W/2r) \quad (1)$$

That is, in the case where the passage 187 is inclined to the left at the maximum angle such that the top portion P of the spring chamber 185a in the vertical direction is located between the left and right boundary lines L1, L2 of the passage 187 as illustrated in FIG. 6, the inclination angle $\theta$ is expressed as follows:

$$-\sin^{-1}(W/2r) \quad \text{[Formula 2]}$$

Accordingly, when the above formula (1) is satisfied, the top portion P of the spring chamber 185a in the vertical direction is located between the left and right boundary lines L1, L2 of the passage 187. Thus, the air that moves to the top portion of the spring chamber 185a can be released upward via the passage 187.

As it has been described so far, in the brake hydraulic pressure controller 20 according to this embodiment, the passage 187, which is provided in the cover member 185 arranged on the release side of the release valve 180 in each of all the pump element 44 and communicates between the spring chamber 185a and the outer surface of the cover member 185, extends upward from the position including the top portion P of the spring chamber 185a in the vertical direction, and is connected to the outer surface.

Thus, even in the case where the air is mixed in the hydraulic circuit, it is possible to suppress retention of the air, which is released with the brake fluid from the release valve 180, in the spring chamber 185a. As a result, it is possible to suppress the operating noise of the brake hydraulic pressure controller 20 from becoming loud.

The preferred embodiment of the present invention has been described in detail so far with reference to the accompanying drawings. However, the present invention is not limited to such an embodiment. It is obvious that a person who has basic knowledge in the technical field to which the present invention pertains could have easily arrived at various modification examples and application examples that fall within the scope of the technical idea described in the claims. It is understood that those naturally fall within the technical scope of the present invention.

In the above embodiment, the description has been made on the brake hydraulic pressure controller that is mounted on a four-wheeled automobile as the example. However, the present invention is not limited to such an example. The brake hydraulic pressure controller may be mounted on another vehicle.

In the above embodiment, the description has been made on the example in which the cover member 185 used to fix the pump element 44 to the recess 131 of the housing 130 is the channel forming member. However, the present invention is not limited to such an example. The present invention can be applied to the brake hydraulic pressure controller as long as the brake hydraulic pressure controller includes a member that is arranged on the release side of the release valve in the pump element and has the passage connecting the spring chamber and the outer surface of the member.

In the above embodiment, the oil channel 111b, into which the brake fluid released from the pump element 44 flows, extends upward from the recess 131. However, the present invention is not limited to such an example. The oil channel 111b may extend laterally or downward from the fluid chamber 133.

In the above embodiment, the cover member 185 includes the one passage 187. However, the present invention is not limited to such an example. In the case where the channel forming member (the cover member) includes the plural passages, at least one of the passages extends upward from the position including the top portion of the spring chamber in the vertical direction, and is connected to the outer surface. Thus, it is possible to suppress the retention of the air bubbles in the spring chamber.

REFERENCE SIGNS LIST

20: Brake hydraulic pressure controller
44: Pump element
96: Motor
110: Hydraulic unit
125: Eccentric bearing
130: Housing
130c: Side surface
131: Recess
133: Fluid chamber
140: Electronic control unit (ECU)
161: Accommodation chamber (pump chamber)
170: Suction valve
180: Release valve
181: Valve body
183: Spring
185: Cover member (channel forming member)
185a: Spring chamber
187: Passage

The invention claimed is:

1. A brake hydraulic pressure controller (20) that controls a hydraulic pressure in a brake hydraulic pressure circuit, the brake hydraulic pressure controller comprising:
a housing (130) that is formed with a channel for a brake fluid;
a motor (96) that is attached to the housing (130); and
plural pump elements (44), each of which is attached to a recess (131) formed on a side surface of the housing (130) and is driven by the motor (96), wherein
each of the pump elements (44) includes: a suction valve (170) that suctions the brake fluid into a pump chamber (161); a release valve (180) that releases the brake fluid from the pump chamber (161); and a channel forming member (185) that is arranged on a release side of the release valve (180),
the channel forming member (185) includes: a spring chamber (185a) that accommodates a spring (183) for urging a valve body (181) of the release valve (180) in a closing direction; and a passage (187) that communicates between the spring chamber (185a) and an outer surface of the channel forming member (185), and
the passage (187) in the channel forming member (185) of each of the plural pump elements (44) extends upward from a position including a top portion of the spring chamber (185a) in a vertical direction, and is connected to the outer surface.

2. The brake hydraulic pressure controller according to claim 1, wherein when the channel forming member (185) is seen in an axial direction, the top portion of the spring chamber (185a) in the vertical direction is located between left and right boundary lines (L1, L2) of the passage (187).

3. The brake hydraulic pressure controller according to claim 2, wherein when the channel forming member (185) is seen in the axial direction, the passage (187) extends upward in the vertical direction from the spring chamber (185a).

4. The brake hydraulic pressure controller according to claim 3, wherein when the channel forming member (185) is seen in the axial direction, the passage (187) extends upward while being inclined to one of left and right sides from an upward direction of the vertical direction, and a width (W) of the passage (187), a radius (r) of the spring chamber (185a), and an inclination angle (θ) of the passage (187) satisfy the following formula (1):

[Formula 1]

$$-\sin^{-1}(W/2r) < \theta < \sin^{-1}(W/2r) \qquad (1).$$

5. The brake hydraulic pressure controller according to claim 1, wherein when the channel forming member (185) is seen in the axial direction, the passage (187) extends upward in the vertical direction from the spring chamber (185a).

6. The brake hydraulic pressure controller according to claim 1, wherein when the channel forming member (185) is seen in the axial direction, the passage (187) extends upward while being inclined to one of left and right sides from an upward direction of the vertical direction, and a width (W) of the passage (187), a radius (r) of the spring chamber (185a), and an inclination angle (θ) of the passage (187) satisfy the following formula (1):

[Formula 1]

$$-\sin^{-1}(W/2r) < \theta < \sin^{-1}(W/2r) \qquad (1).$$

* * * * *